United States Patent [19]

Malloy

[11] 3,763,719

[45] Oct. 9, 1973

[54] MULTI-SPEED AUTOMATIC TRANSMISSION

[75] Inventor: John D. Malloy, Troy, Mich.

[73] Assignee: General Motors Corporation, Detroit, Mich.

[22] Filed: June 27, 1972

[21] Appl. No.: 266,541

[52] U.S. Cl. .................................................. 74/761
[51] Int. Cl. ............................................. F16h 57/10
[58] Field of Search ..............................74/759–761

[56] References Cited
UNITED STATES PATENTS

| | | | |
|---|---|---|---|
| 2,827,805 | 3/1958 | Miller | 74/761 |
| 2,901,923 | 9/1959 | Waclewek | 74/761 X |
| 3,509,784 | 5/1970 | Mahoney | 74/759 X |
| 3,564,938 | 2/1971 | Hause | 74/761 |

Primary Examiner—Arthur T. McKeon
Attorney—W. E. Finken et al.

[57] ABSTRACT

A multi-speed automatic transmission having two friction clutches and three friction brakes, all of which are selectively operable to provide a plurality of speed ratios between an input and output shaft through a compound planetary gear set. The gear set includes a pair of sun gears, a pair of ring gears and a plurality of pinion gears which mesh with the sun and ring gears and are rotatably mounted on a carrier which is drivingly connected to the output shaft. The ratio of the pitch diameters ($R_1/R_2$) of the ring gears and the ratio of the pitch diameters ($S_1/S_2$) of the sun gears are both greater than one (1.00). The steps between the speed ratios are such as to provide substantially equal output speed steps at a constant input upshift speed.

3 Claims, 1 Drawing Figure

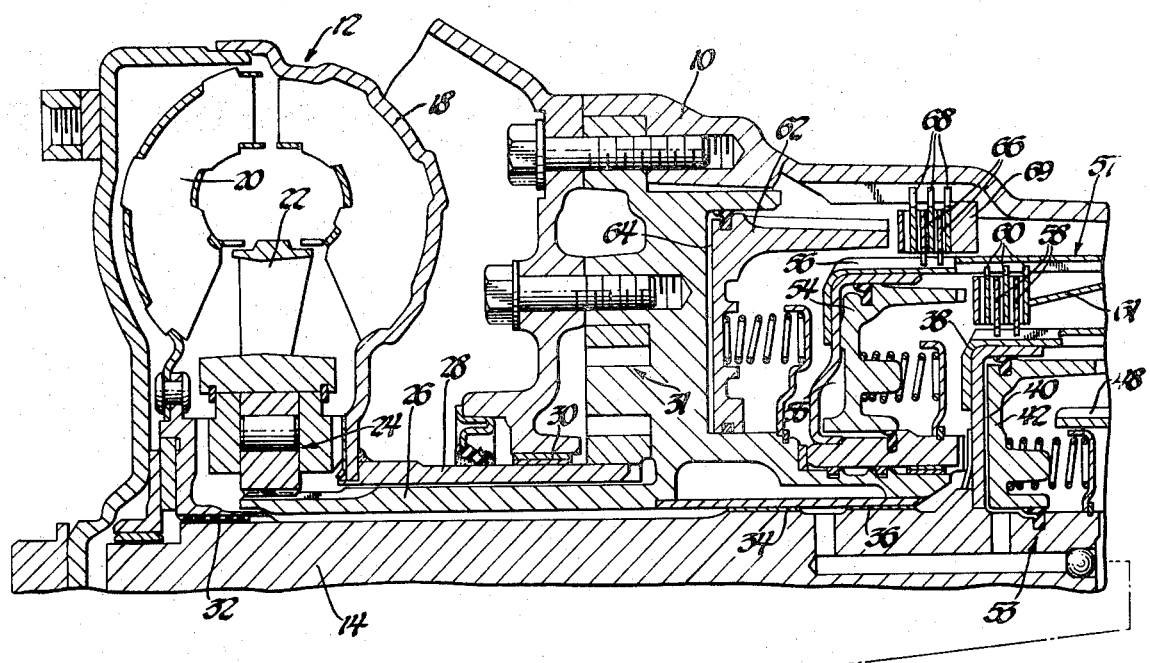

MULTI-SPEED AUTOMATIC TRANSMISSION

This invention relates to multi-speed transmissions and more particularly to four speed transmissions wherein a planetary gearing arrangement is controllable by friction devices to provide a plurality of constant output speed steps in the forward speed ratios.

The present invention utilizes a compound planetary gearing arrangement in which the various members of the planetary arrangement are selectively controllable by clutches and brakes to provide four forward speeds and a reverse speed. The planetary gearing arrangement includes an input-reaction ring gear, a reaction ring gear, an input sun gear, a reaction sun gear and a planet carrier having a plurality of inter-meshing planet gears. The planet carrier is drivingly connected to the output shaft of the transmission. One set of the planet gears meshes with the input sun gear and the reaction ring gear and another set of planet gears meshes with the input-reaction ring gear and the reaction sun gear. The ratio of the pitch diameters of the input-reaction ring gear and the reaction ring gear and the ratio of the pitch diameters of the input sun gear and the reaction sun gear are both greater than one. By maintaining these ratios between the ring gears and sun gears, it is possible to provide speed ratios in the transmission which establish an equal output speed step in each speed ratio. Equal output speed steps means the output speed increment in each ratio as the vehicle is accelerated is essentially equal assuming all the upshifts are made at the same input speed.

Prior art transmissions generally have a geometric or constant input speed steps between speed ratios. These prior art transmissions provide more ratio coverage at lower ratio speeds but spread the ratio coverage in the upper speed ratios, thereby leaving performance gaps at the higher speeds. The constant output speed step gives better over-all performance particularly for small low power vehicles in which a four speed transmission is most desirable.

It is, therefore, an object of this invention to provide an improved multi-speed automatic transmission having a pitch diameter ratio greater than one (1.00) between the input-reaction and reaction ring gears and a pitch diameter ratio greater than one (1.00) between the input and reaction sun gears.

It is anohter object of this invention to provide an improved multi-speed automatic transmission having a planetary gearing arrangement providing a plurality of speed ratios having substantially constant output speed steps therein.

These and other objects and advantages of the present invention will be more apparent from the following description and drawing in which is shown an elevational cross-sectional view of the preferred embodiment of the invention.

Referring to the drawing there is shown a transmission having a stationary housing 10, a torque converter 12, an input shaft 14, an output shaft 15 and a planetary gearing arrangement, generally designated 16. The torque converter 12 is a conventional type torque converter having an impeller 18, a turbine 20 and a stator 22 which is connected to the transmission housing through a one-way brake 24 by a stator support shaft and pump housing 26.

The impeller 18 is driven by an engine, not shown, and has secured thereto a sleeve shaft 28 rotatably journaled in the housing 10 by a bushing 30. The shaft 28 drives a conventional internal-external type gear pump generally designated 31 which supplies fluid to operate the various clutches and brakes of the transmission when the impeller 18 is being driven by the engine.

The turbine 20 is drive connected to the input shaft 14 by splines 32. The input shaft 14 is rotatably supported in the pump housing 26 by a pair of bushings 34 and 36 and is drive connected to a clutch drum 38. The clutch drum 38 has an annular chamber 40 formed therein in which is slidably mounted a clutch piston 42. Adjacent the clutch piston 42 are a plurality of friction plates 44 and 46 which are alternately splined to the clutch drum 38 and a hub 48, respectively. A backing plate 50 for the friction plates 44 and 46 is also splined to the clutch drum 38 and forms the outer race for a one-way clutch 52, the inner race for which is formed on the hub 48. The clutch drum 38, piston 42, plates 44, 46 and 50 form a fluid operated clutch 53 which is operable to connect the clutch drum 38 to the hub 48 when fluid pressure is admitted to the chamber 40.

A second fluid operated clutch 57 is formed by a piston 54 slidably disposed in an annular chamber 55 of a clutch drum 56 and a plurality of friction plates 58 and 60 alternately spaced between the clutch drums 38 and 56, respectively. A backing plate 61 for the plates 58 and 60 is also splined to the clutch drum 56. A friction brake for the clutch drum 56 is formed by a piston 62, slidably disposed in an annular chamber 64 formed in the pump housing 28, a plurality of friction plates 66 and 68 alternately splined between the clutch drum 56 and the transmission housing 10 and a backing plate 69 also splined to the housing 10. The clutch and brakes described above are preferably of the fluid operated type and are shown in U.S. Pat. No. 3,554,057 issued to Michnay et al., Jan. 12, 1971, wherein a more detailed description of the structures can be found.

The planetary gearing 16 includes an input sun gear 70 formed on the hub 48, an input-reaction ring gear 72 splined to the clutch drum 56, a reaction sun gear 74, a reaction ring gear 76, a planet carrier 78, planet pinions 80 rotatably mounted on pins 82 in the carrier 78 and meshing with the input sun gear 70 and the reaction ring gear 76, pinion gears 84 rotatably mounted on pins 86 secured in the carrier 78 and meshing with the input-reaction ring gear 72 and pinions 88 rotatably mounted on pins 90 secured in the carrier 78 and meshing with the reaction sun gear 74. The pinions 84 and 88 also mesh with the pinions 80. For proper load distribution there are preferably three or four of each of the pinions 80, 84 and 88 equally spaced respectively on the carrier 78. The carrier 78 has a splined inner diameter 92 which engages corresponding splines on the output shaft 15 to provide a drive connection between the carrier 78 of the output shaft 15. The reaction sun gear 74 is splined to a hub 94 which has a cylindrical surface 96 formed thereon to permit the conventional band 98 to be selectively brought into contact with the cylindrical surface 96 to permit the sun gear 74 to be held stationary.

The ring gear 76 is formed on a brake drum 100 which is rotatably journaled on a sleeve 102 secured to the transmission housing 10. A double wrapped band 104 located circumjacent the brake drum 100 provides a reaction connection for the reaction ring gear 76. The double wrapped band 104 may be constructed similar to the double wrapped band described in Vossler et al., U.S. Pat. No. 2,975,870. The clutches and brakes described above are preferably of the fluid operated type and may be controlled by any of the available fluid control systems.

In neutral all clutches and brakes are released. To establish the first forward ratio the brake band 104 is energized and the one-way clutch 52 provides a drive from the input shaft 14 to the input sun gear 70. With the sun gear 70 driven by the input shaft 14 and the ring gear 76 held stationary by the brake 104 the carrier 78 will be driven forwardly at a reduced ratio through the action of pinions 80.

To establish second gear forward the brake band 98 is energized and the brake band 104 is de-energized, thus establishing the sun gear 74 as a reaction member in the planetary gearing arrangement 16. The input during this ratio is through the one way clutch 52 to the sun gear 70. The motion is transmitted from the input sun gear 70 through the planetary gears 80 and 88 to the carrier 78 which drives the output shaft 15.

The second gear ratio, described above, providing a one way input to the gearing is preferred. The use of the one way device permits downshifting from fourth to second or first and from third to second or first without controlling the overlap of the friction devices. The elimination of the overlap control permits the controls to be of simpler design.

An additional second gear operation is provided by energizing the clutch piston 54 and the brake band 104, thereby connecting the input-reaction ring gear 72 to the input shaft 14 and holding the reaction ring gear 76 stationary. In this second gear operation the planet carrier 78 will be driven forward at a reduced speed through the movement of planet pinions 84 and 80. In this ratio the one way clutch 52 freewheels.

To establish third gear forward the clutch 54 is energized while the brake band 98 remains energized, this establishes ring gear 72 as the input member in the planetary gearing arrangement while ring gear 76 is free to rotate. In this gear ratio, motion is transmitted from the ring gear 72 to the planet carrier 78 through the pinion gears 84, 80 and 88. In this ratio the one way clutch 52 freewheels.

To establish fourth gear forward the brake band 98 is de-energized while the clutch piston 42 is energized and the clutch piston 54 remains energized. The actuation of pistons 54 and 42 cause the planetary set to be rotated in a 1:1 relationship since both the input sun gear 70 and the input-reaction ring gear 72 are driven at input speed. Thus, the carrier 78 is driven at input speed providing a 1:1 drive ratio between the input shaft 14 and the output shaft 15. In this ratio the one way clutch 52 is locked by the clutch 53.

To establish reverse drive the piston 62 is energized while all the other clutches and brakes are released. This establishes input-reaction ring gear 72 as the reaction member in the planetary gear set and the one way clutch 52 provides a drive between the input shaft 14 and the input sun gear 70. Motion is transmitted reversely from the input sun gear 70 to the carrier 78 through the action of the pinion gears 80 and 84.

During the above described first forward gear ratio, the second gear ratio and the reverse ratio, the clutch piston 42 can be energized to establish a two way drive between the input shaft 14 and the input sun gear 70 thereby providing engine braking in the transmission.

As can be seen in the drawing, the pitch diameter $R_1$ of ring gear 72 is larger than the pitch diameter $R_2$ of the ring gear 76 and the pitch diameter $S_1$ of the sun gear 70 is larger than the pitch diameter $S_2$ of the sun gear 74. Thus, the ratio $R_1/R_2$ and the ratio $S_1/S_2$ are both greater than one (1.00).

The following two examples set forth the number of gear teeth which can be used on the various sun and ring gears in the planetary gearing arrangement to provide the proper drive ratios and also provide the desired pitch diameter ratios of the sun gears and ring gears, as discussed above.

EXAMPLE I

|  | Number of Teeth |  |
|---|---|---|
| Ring Gear 72 | 101 |  |
|  |  | $R_1/R_2 = 1.23$ |
| Ring Gear 76 | 82 |  |
|  |  | $S_1/S_2 = 1.12$ |
| Sun Gear 70 | 35 |  |
| Sun Gear 74 | 31 |  |

| | Input/Reaction | Ratio | Output Speed Step with Upshift at 4000 rpm input |
|---|---|---|---|
| 1st Gear | 70/76 | 3.343 | |
| 2nd Gear | 70/74 | 1.886 | 935 rpm |
| 3rd Gear | 72/76 | 1.307 | 930 rpm |
| 4th Gear | — | 1.00 | 950 rpm |
| Reverse | 70/72 | 1.886 | |

EXAMPLE II

|  | Number of Teeth |  |
|---|---|---|
| Ring Gear 72 | 88 |  |
|  |  | $R_1/R_2 = 1.19$ |
| Ring Gear 76 | 74 |  |
|  |  | $S_1/S_2 = 1.19$ |
| Sun Gear 70 | 31 |  |
| Sun Gear 74 | 26 |  |

| | Input/Reaction | Ratio | Output Speed Step with Upshift at 4000 rpm input |
|---|---|---|---|
| 1st Gear | 70/76 | 3.390 | |
| 2nd Gear | 70/74 | 1.841 | 980 rpm |
| 2nd Gear (optional) | 72/76 | 1.841 | |
| 3rd Gear | 72/74 | 1.295 | 920 rpm |
| 4th Gear | — | 1.00 | 900 rpm |
| Reverse | 70/72 | 1.84 | |

As can be seen from the above examples, the output speed step in each forward drive ratio is substantially constant when the input upshift speed is held constant. The ratios $R_1/R_2$ and $S_1/S_2$ make possible the transmission ratios which provide these substantially equal output speed steps. If a geometric step ratio gearing arrangement is used in place of the gear ratios of Example II to provide the same overall coverage, this is a first gear ratio of 3.39 and a fourth gear ratio of 1.00, the output speed steps at a constant input upshift speed will vary considerably. Using the geometric step ratio and assuming constant upshift input speed of 4,000 rpm, the output speed step in second gear will be 590 rpm, the output speed step in third gear will be 880 rpm and the output speed step in fourth gear will be 1,320 rpm.

Obviously, many modifications and variations of the present invention are possible in light of the above teachings. It is, therefore, to be understood that within the scope of the appended claims the invention may be practiced otherwise than as specifically described.

What is claimed is:

1. In a multi-speed transmission, stationary housing means; input means; output means; first and second selectively operable clutch means operatively connected to said input means; first, second and third selectively operable brake means operatively connected to said housing means; and planetary gear-ing means including a first sun gear operatively connected to said first clutch means, first ring gear means operatively connected to said second clutch means and said first brake means; a second sum gear operatively connected to said second brake means and having a pitch diameter smaller than said first sun gear; a second ring gear operatively connected to said third brake means and having a pitch diameter smaller first sun said first ring gear, first pinion means drivingly connected to said firstsun gear and said second ring gear, second pinion means drivingly connected to said first ring gear, said second sun gear and said first pinion means; and carrier means rotatably supporting said first and second pinion means and being drivingly connected to said output means.

2. In a multi-speed transmission, stationary housing means; input means; output means; first and second selectively operable clutch means operatively connected to said input means; first, second and third selectively operable brake means operatively connected to said housing means; and planetary gearing means including an input sun gear means operatively connected to said first clutch means, input-reaction ring gear means operatively connected to said second clutch means and said first brake means; reaction sun gear means operatively connected to said second brake means and having a pitch diameter smaller than said input sun gear means; reaction ring gear means operatively connected to said third brake means and having a pitch diameter smaller than said input-reaction ring gear means, first pinion means drivingly connected to said input sun gear means and said reaction ring gear means, second pinion means drivingly connected to said input-reaction ring gear means and said first pinion means; third pinion means drivingly connected to said reaction sun gear means and said first pinion means; and carrier means rotatably supporting said first, second and third pinion means and being drivingly connected to said output means.

3. A four speed planetary transmission comprising; stationary housing means; input means; output means; and planetary gearing means for providing substantially equal output speed steps in the forward gear ratios when a constant input upshift speed is maintained including, input sun gear means, input-reaction ring gear means, reaction sun gear means, reaction ring gear means, planet carrier means drivingly connected with said output means including first planet pinion means meshing with said input sun gear means and said reaction ring gear means and second planet pinion means meshing with said input-reaction ring gear means, said reaction sun gear means and said first planet pinion means, first clutch means for selectively drivingly connecting said input means and said input sun gear means, second clutch means for selectively drivingly connecting said input means and said input-reaction ring gear means, first brake means for selectively connecting said input-reaction ring gear to said stationary housing means, second brake means for selectively connecting said reaction sun gear means with said stationary housing means and third brake means for selectively connecting said reaction ring gear means with said housing means; the ratios of the pitch diameters of the input sun gear means to the reaction sun gear means and the input-reaction ring gear means to the reaction ring gear means both being greater than 1.00.

* * * * *